March 2, 1937.  H. J. FINDLEY  2,072,744
HEATER FOR AUTOMOBILES
Filed March 1, 1934   2 Sheets-Sheet 1

INVENTOR.
Howard J. Findley.
BY
ATTORNEYS.

March 2, 1937. H. J. FINDLEY 2,072,744
HEATER FOR AUTOMOBILES
Filed March 1, 1934 2 Sheets-Sheet 2
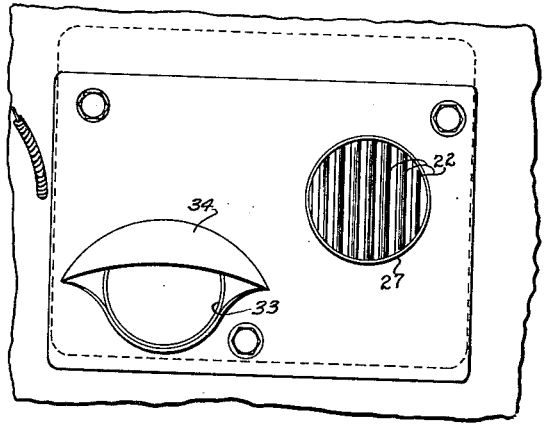
Fig. 4.
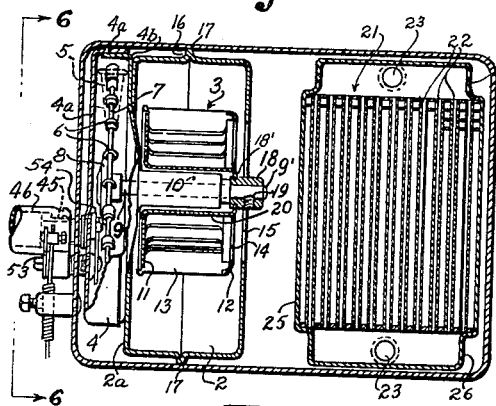
Fig. 5. Fig. 7.
Fig. 6.
INVENTOR.
Howard J. Findley.
BY Slough & Canfield
His ATTORNEYS.

Patented Mar. 2, 1937

2,072,744

UNITED STATES PATENT OFFICE 2,072,744

HEATER FOR AUTOMOBILES

Howard J. Findley, Cleveland, Ohio, assignor to The Bishop & Babcock Mfg. Company, Cleveland, Ohio, a corporation of Ohio Application March 1, 1934, Serial No. 713,543

4 Claims. (Cl. 237—12.3)

My invention relates to improvements in automobile heaters and relates to automobile heaters employed for the purpose of warming the air in the passenger compartment of an automobile or like automotive vehicle.

Heretofore, heaters have commonly employed a motor driven fan to force air through the air passages of a water radiator through which heated water taken from the water cooling circulatory system of the internal combustion engine of the automotive vehicle is continuously circulated.

Such prior apparatus has usually been in the form of a casing containing in its forward portion the hot water radiator, the air passages thereof extending in a forward and rearward direction therethrough. To the rear of the casing in spaced relation thereto is secured a frame carrying an electric motor, or the like, driving a fan having three or more blades disposed on the motor shaft between the radiator core and the motor. The entire assembly, which is mounted in the passenger compartment of the automobile, is generally bolted to a lower front wall of the passenger compartment, commonly called the dash, with a pair of conduits passing from said apparatus through said wall and making connection forwardly of the wall in the engine compartment of the vehicle with rubber or like tubes. Said tubes receive a part of the water forced through the cooling jacket of the automobile by the ordinary water pump therefor, and return the water which has been by-passed through the core of the radiator of said heating apparatus to the intake side of said water pump.

The placement of the heater of the above or similar type within the passenger compartment of the vehicle limits the room provided for the passenger so much as to involve personal discomfort of the passenger in many cases, and in other cases where the automobile manufacturer has sought to avoid such personal discomfort, it involves more expensive construction of the automobile.

An object of my invention therefore is to provide a hot water heater of the motor driven fan-hot water radiator type, so constructed as to be efficiently adapted for disposition within the engine compartment of the automobile, as distinguished from the passenger compartment, and to supply a strong current of heated air by a tubular discharge outlet extending within the passenger compartment of the vehicle, said outlet element being of small size relative to the size of the complete heater.

Another object of my invention is to provide an improved hot-water heated air heater of increased efficiency in more compact form.

Another object of my invention is to provide an improved assembly of the operative elements of a hot water heated air type of automobile heater to facilitate the mounting thereof outside the passenger compartment of the automobile.

Another object of my invention is to provide improved means for receiving air from the passenger compartment of the automobile and heating said air continuously by unitary hot water air heating apparatus mounted without the passenger compartment of the automobile.

Another object of my invention is to provide an improved air heater for automotive vehicles so disposed in the engine compartment of the automobile vehicle as to receive heat from air currents circulated within the engine compartment to increase the thermal efficiency of the heater.

Other objects of my invention, though not specifically above referred to, will be clear from the following description of an embodiment of my invention as applied to an automobile for the purpose of heating the passenger compartment thereof and illustrated in the accompanying drawings, wherein:

Fig. 4 is a front elevational view thereof;

Fig. 5 is a sectional view of said apparatus, taken on the line 5—5 of Fig. 2;

Fig. 6 is a view taken partly in section and partly in elevation of the said apparatus; and Fig. 7 is a sectional view of the said apparatus taken on the line 7—7 of Fig. 2.

Figure 1:
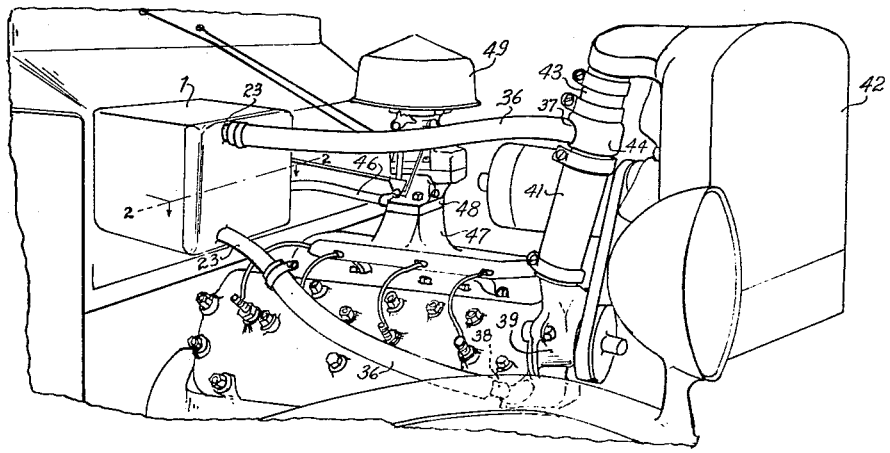
Fig. 1 is a diagrammatic view illustrating an embodiment of my invention applied to an automobile.

Referring to the embodiment of my invention illustrated in the different figures of drawings, in all of which like parts are designated by like reference characters, at 1 I show the main casing of the heater apparatus which is preferably made of sheet metal, and within which there is mounted a sheet metal fan blower housing 2, a motor casing 4 and a radiator casing 25, said casing having mounted therein, respectively, a rotatable fan blower 3, a motor rotor 7, and a radiator core 21.

While the motor within the casing 4 may be of any desired type, the drawings illustrate a preferred form wherein a concentrated blast of converged air admitted to the interior of the motor casing 4 through a tapered tubular inlet element 5 impinges upon cup-shaped vanes 6, a large number of which are provided in spaced relation on the periphery of the rotor wheel 7. The wheel 7 is rigidly secured by its hub 8 on a rotatable shaft 9 suitably journaled in the tubular bearing 10 which projects axially from the motor casing 4 into the interior of the pump casing 2.

The motor casing 4 comprises a pair of oppositely disposed, relatively telescoped, sheet metal cup elements 4a and 4b rigidly fitted together by their relatively telescoped sides; the end wall of the cup element 4b which carries the tubular shaft bearing 10 being rigidly affixed by spot welding, soldering, or in any suitable manner, to the contiguous wall 2a of the pump casing, which is apertured to admit the outwardly bulging wall of the motor casing which in turn supports said tubular bearing 10.

The pump 3 is provided with a pair of spaced annular vane supporting ends 11 and 12, which are rigidly interconnected by the pump vanes 13, a large number of which are provided in spaced relation to each other, and which preferably extend inwardly from the peripheral supporting portions of said end elements. The vane supporting end 12 is provided with an enlarged air inlet port or opening 14 presented towards and disposed contiguous to a corresponding inlet port or opening 15 in the adjacent side wall of the pump casing 2.

The peripheral wall of the pump casing 2 is preferably medially beaded at 16 to strengthen such wall. The bead 16 provides a suitable peripherally disposed means whereby the pump casing and the main casing walls may be spot welded together, as at a plurality of points 17.

The pump rotor 3 is rigidly mounted upon a tubular rotor support 18 affixed by a set screw 19 or in any other suitable way to the end 9' of the motor rotor shaft 9. This is preferably accomplished by providing a reentrant tubular projection 20 for the rotor end 11, said tubular projection being of such a diameter as to be slightly radially spaced outwardly of the bearing 10, and substantially spaced within the converging radially inwardly extending pump vanes 13, the tubular extension 20 extending beyond the end of the bearing 10 and rigidly affixed to the rotor support 18 as at 18'.

When the rotor 3 is driven by the motor 4, the vanes 13, engaging the air between the vanes, forces the air outwardly by centrifugal force against the inner surfaces of the walls 3a of the pump casing, which are nearest the pump rotor at a point 3b and which progressively curvilinearly recede from the periphery of the pump rotor until a maximum spacing between the outer casing wall and the pump rotor is effected at points 3c, according to common practice for air blowers of the type described.

Figure 2:
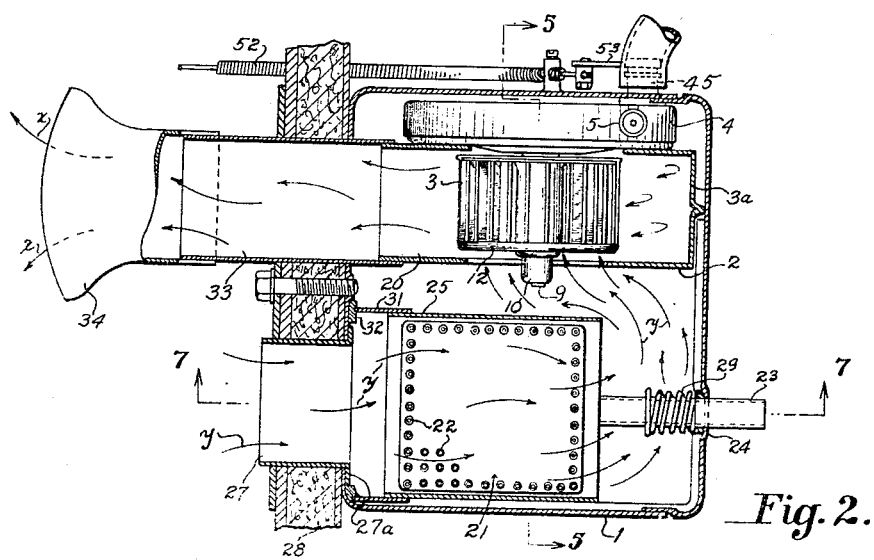
Fig. 2 is an enlarged sectional view through an assembled heater unit of the said embodiment comprising a heater casing, an air heater and air blower mechanism, taken on the line 2—2 of Fig. 1.
Figure 3:
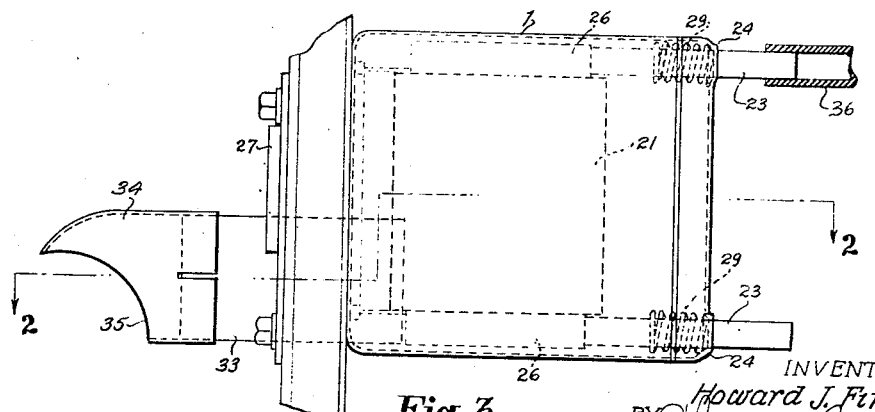
Fig. 3 is a side elevational view of the apparatus of Fig. 2.

A tubular discharge conduit 20 forming an extension of the pump casing 2 joins the walls of the casing proper at the points 3b and 3c and extends outwardly from the pump chamber in a generally tangential direction to convey air set into rotary circulation within the pump chamber provided by the casing 2 outwardly therefrom in the direction of the arrows x, Figs. 2 and 6.

Meanwhile, new air is continuously being drawn axially into the pump rotor through the aligned openings 14 of the rotor 15 of the pump casing from the space within the main casing 1 of the apparatus, which new air has been preheated by being passed through the air passages 5 of a radiator core 21, which, in the embodiment illustrated, contains tubular transversely extending passages 22 through which hot water from the internal combustion engine circulatory liquid cooling system continuously flows via the pair of hot water conduits 23. The radiator core 21 comprises a pair of heads 26 at either end of the tubular hot water conduits 22, hot water being continuously circulated from one of these heads to the other from the water cooling circulatory system of the internal combustion engine with which the automotive vehicle is equipped.

To supply air to the interior of the main casing 1, from which it is drawn into the pump casing 2, as described, a tubular inlet element 27, affixed to and forming an extension from the casing 1, is provided, which is soldered or welded by its radial flange 27a to the inner surface of the front wall of the main casing 1. The tubular portion of the inlet element 27 is projected through the wall 28, which divides the passenger compartment of the vehicle from the engine compartment. In Figs. 2 and 7, I have illustrated by arrows y, the inflowing currents of air withdrawn from the passenger compartment of the vehicle, and caused to flow through the entire length of the radiator core, being in intimate contact with the outer surfaces of the tubular water conduits of the radiator core 21.

The radiator is held in place within the main casing 1 by spring pressure exerted by the coiled springs 29, encircling the hot water conduits 23 and interposed between outwardly deflected apertured portions 24 of the casing 1 and rings 30 press-fitted onto the outer surfaces of said tubular conduits, the conduits 23 being rigidly affixed to the radiator core heads 26 and communicating with the interior thereof. The pressure exerted by the springs 29 forces the radiator core 21 forwardly, and by a forwardly disposed tubular extension 31 of said core and an interposed sealing gasket 32, effects resiliently maintained sealed engagement with the inner surface of the front wall of the casing 1.

By virtue of this construction, said radiator core 21 is resiliently maintained in proper operated position within the main casing 1, and adapted at all times to receive air from the interior of the passenger compartment on the one side of the wall 28, and to redeliver it to the passenger compartment in a heated condition. The radiator core redelivers the air which it receives from the passenger compartment in a heated condition by delivering the air received to the blower 3 through the hot air delivery tube 33, which extends from the tubular discharge element 20 of the blower forwardly therefrom through the wall 28 of the passenger compartment in suitable spaced relation to the air inlet tube 27.

Besides being laterally and vertically spaced from each other, the air inlet and air outlet tubes 27 and 33, respectively, are preferably of different lengths, the tube 33 being preferably the longer. At its end the tube 33 is preferably fitted with a relatively rotatable air deflector 34 having a discharge mouth 35 of suitable form as shown, so that, by rotating the deflector 34 to any desired adjusted position, the blast of heated air emanating therefrom may be suitably directed in any angular direction desired.

It will be understod that the conduits 23 which communicate with the radiator core heads 26 extend outwardly through the apertured rear wall of the main casing 1 and are then connected to flexible rubber tubing 36, which, as illustrated in Fig. 1, extend to points such as 37 and 38, whereby the radiator core 21 is continuously supplied with hot water from the operating internal combustion engine cooling water jacket from the point 37, the water being returned from the radiator core of the apparatus to the point 38 on the approach side of the water pump 39, of the liquid cooling circulatory system. From thence it is forced into the engine cooling jacket 40 and again returned through the conduit 41 to the point 37, whence a portion of the heated water is again returned to the radiator core as described.

The water cooling circulatory system for the internal combustion engine comprises the usual radiator 42 for cooling the water in the system to prevent boiling thereof. A thermostatically operated valve device, indicated at 44, is preferably placed in the conduit 43 leading to the radiator 42, for restraining the flow of water from the engine jacket to the said radiator 42, except when or until the water has reached a desired minimum temperature such as 140° Fahrenheit, which is considered to be a suitable operating temperature for the water surrounding the cylinders in the engine.

The thermostat 44, or equivalent device for the described purpose, hastens the heating of the water in the engine jacket by preventing premature cooling thereof by the radiator 42, and ensures that, within a short time after the engine is started in operation, the hot water radiator core 21, disposed within the main casing 1, will receive a flow of water sufficiently heated as to substantially increase the temperature of air currents directed through it and resupplied to the passenger compartment of the automobile or other vehicle, by virtue of the operation of the blower 3, as described.

The air motor within the casing 4 is operated by placing the interior of the motor casing 4 in communication with the intake manifold of the internal combustion engine, which may be readily effected by providing a nipple 45, affixed and extending through the wall 4a of the motor casing 4, and a flexible tube of rubber 46 or the like extended therefrom to the approach of the intake manifold 47 of the engine.

In Fig. 1 I show a block 48 interposed between the carburetor 49 and the intake manifold 47 which is suitably apertured to maintain intercommunication between the carburetor and the intake manifold of the engine, and is provided with a lateral bore through which the tube 46 communicates with the interior passage leading from the carburetor 49 to the intake manifold 47.

In this manner the sub-atmospheric pressure of the intake manifold 47 is communicated to the interior of the motor casing 4 causing a rush of air at atmospheric pressure through the conical air inlet 5, which, emerging from the restricted orifice of said inlet element 5, impinges upon the motor rotor vanes 6, as previously described, to cause rotation of the rotor.

I find in operation that the rotor 7 of the motor causes the blower rotor 3 to be rotated at a speed of several thousand revolutions per minute or more, which is sufficient to cause a blast of heated air at high velocity to be projected into the passenger compartment of the vehicle when the motor is in operation.

Often in mildly cool weather, it is not desired to heat the passenger compartment to the maximum degree and at such times the temperature can be suitably regulated by reciprocation of the adjustable knob 50 disposed on the instrument board within the passenger compartment. Said knob 50, through the rod 51 and flexible wire 52, rotates a bell crank lever 53 to which the end of the wire 52 is secured to adjustably superpose a valve disc 54 over the inlet port 55, whereby the air, supplied through the conical inlet 5 to the interior of the motor casing 4 causing rotation of the rotor 7, is throttled in its path from the casing 4 to the intake manifold of the engine. This throttling is adjustable and the placement of the valve disc on the approach side of the port 55 causes the valve disc to be drawn closely against the surfaces of the port 55 because of the greater pressure of air on the approach side of the disc. This effect is sometimes popularly called suction effect.

It will be noted that the casing 1 is disposed within the engine compartment and reasonably close to the engine at the rear thereof so that heated air currents within the engine compartment impinge upon the outer surfaces of the metal casing 1 so as to substantially raise its temperature during operation of the engine. This arrangement is very conducive to efficient operation of the heater, since the air circulated through the casing by the blower is not chilled by contact with cooler walls of the casing, but on the contrary, the heated walls contribute to the heating of the air passed through the casing en route to the blower.

Having thus described my invention in a specific embodiment, I am aware that numerous and extensive changes may be made from the embodiment herein illustrated and described, but without departing from the spirit of my invention, and I therefore claim my invention as set forth in the claims accompanying this specification and forming a part thereof.

I claim:

1. In a heating system for automotive vehicles having a passenger compartment and an engine compartment and a compartment wall therebetween, an engine in the engine compartment having a circulatory cooling system, a walled casing on the compartment wall in the engine compartment, clamp means on the wall in the passenger compartment cooperating with the casing to clamp the wall between the clamp means and the casing to support the casing solely by the wall and out of contact with the engine, aligned air inlet orifices in a wall of the casing and in the compartment wall, a heater comprising a heater housing in the casing communicating with the aligned inlet orifices and having an outlet orifice, air heating means between the inlet and outlet orifices, means for supplying heat to the air heating means from the engine cooling system and means for yieldably holding the heater housing upon the casing inner wall to seal the housing with the air inlet orifices and means to force heated air out of the casing directly into the passenger compartment.

2. In an automotive vehicle heater construction, a casing containing an air heating radiator comprising a liquid-heated core having a walled air passageway therethrough, conduits communicating with the core and extending outwardly of the casing for connection to the liquid cooling system of the vehicle engine, an opening in the casing wall, the air passageway of the radiator opening at one end into the casing interior and at its opposite end engaging the casing adjacent the periphery of the opening, the radiator being movable relative to the casing and resilient means maintaining pressure engagement between the radiator and casing.

3. In an automotive vehicle heater construction, a casing containing an air heating radiator comprising a liquid-heated core having a walled air passageway therethrough, the radiator being movable relative to the casing, conduits communicating with the core and extending outwardly of the casing for connection to the liquid cooling system of the vehicle engine, an opening in the casing wall, the air passageway of the radiator opening at one end into the casing interior, sealing means adjacent the periphery of said opening, and the other end of the passageway engaging said sealing means, and resilient means maintaining pressure engagement between the casing and radiator to seal the passageway with respect to the opening.

4. A unitary heater for heating the passenger compartment of an automotive vehicle of the type having a wall between the passenger and engine compartments, comprising a generally box-shaped casing detachably mounted on the wall and within the engine compartment, a heat exchange unit and a blower within the casing, the heat exchange unit being movable relative to the casing, conduit means adapted to effect circulation of heated water through the heat exchange unit from the liquid cooling system of the vehicle, adjacent perforations in the casing wall, one of said perforations forming an inlet through the heat exchange unit for air from the passenger compartment, the other of said openings forming an outlet for heated air from the blower, and resilient means maintaining the heat exchange unit in sealing contact with casing portions adjacent said inlet opening.

HOWARD J. FINDLEY.